B. W. KING.
THERMOSTATIC DEVICE FOR SCALES.
APPLICATION FILED APR. 30, 1919.

1,348,225.

Patented Aug. 3, 1920.

Inventor
Bert W. King
by his Attorneys
Kerr, Page, Cooper & Hayward

UNITED STATES PATENT OFFICE.

BERT W. KING, OF DETROIT, MICHIGAN, ASSIGNOR TO DETROIT AUTOMATIC SCALE COMPANY, OF DETROIT, MICHIGAN, A CORPORATION OF INDIANA.

THERMOSTATIC DEVICE FOR SCALES.

1,348,225.   Specification of Letters Patent.   Patented Aug. 3, 1920.

Application filed April 30, 1919. Serial No. 293,738.

*To all whom it may concern:*

Be it known that I, BERT W. KING, a citizen of the United States, residing at Detroit, in the county of Wayne and State of Michigan, have invented certain new and useful Improvements in Thermostatic Devices for Scales, of which the following is a full, clear, and exact description.

In weighing scales in which all or part of the load to be weighed is counterbalanced by a spring it is now well known that the accuracy of the scale is affected by changes in temperature, due to the fact that the spring elongates and becomes softer as the temperature rises and shortens and becomes stiffer as the temperature lowers. The softening of the spring affects what is known as the weighing balance by causing the scale to weigh heavier, that is, indicate a greater weight than the true weight of the goods, while the stiffening of the spring operates in the opposite direction. At the same time the elongation or contraction of the spring affects the zero balance by shifting the drum or pointer away from the zero point when there is no load on the scale.

It has therefore become the universal practice to equip the scale with a thermostatic device or mechanism, by which the effects of temperature variation are nullified or compensated. My present invention relates to devices for this purpose, and its chief object is to provide a thermostat of simple and durable construction, which will not itself directly be affected by the weight of the goods. Another object is to provide a thermostat which will act quickly so that there will be as short an interval as possible between a change of temperature and the necessary restoration of the scale to its normal accuracy. To these and other ends the invention consists in the novel features and combinations hereinafter described.

Figure 1:
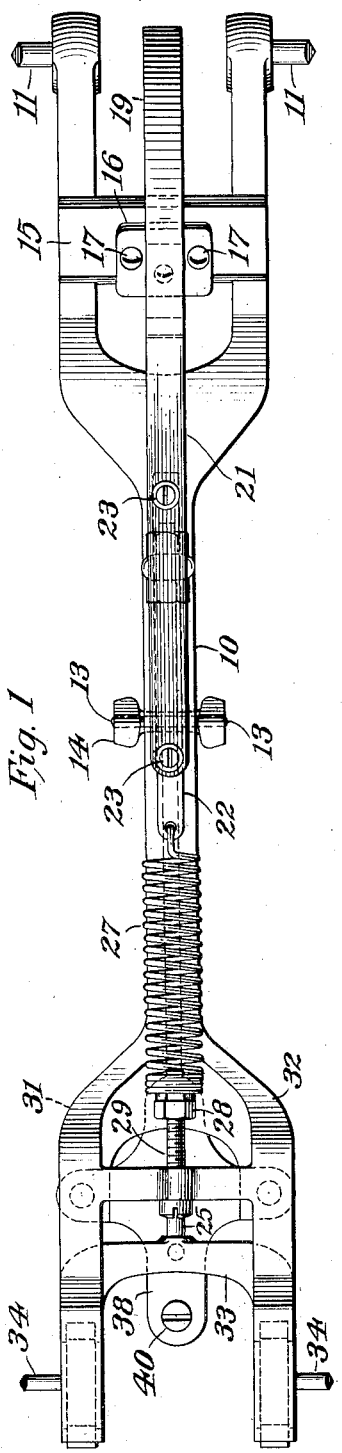
Figure 2:
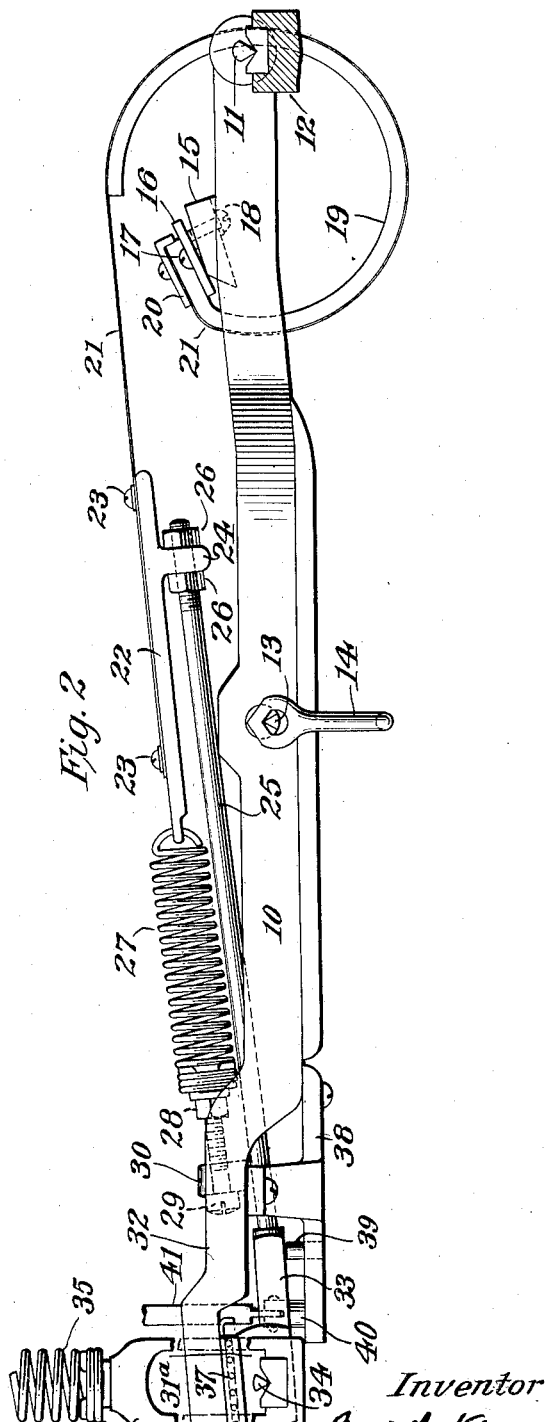

One embodiment of the invention is illustrated in the accompanying drawings, in which: Figure 1 is a plan view of a scale lever equipped with my improved thermostat. Fig. 2 is a side view of the same.

The scale lever 10 is forked at both ends, and the arms of the fork at one end are provided with knife-edges 11 resting on the usual fulcrums, as 12, suitably supported. Between the ends, knife-edges 13 are provided for connection with a steelyard rod (not shown) or for a shackle 14 from which the load to be weighed can be suspended.

Across the arms at the fulcrum end of the lever, and preferably integral with the arms, is a supporting bar 15, on top of which is a carrier plate 16 held on the bar by a pair of screws 17. A screw 18, extending through the bar from the underside, bears against the carrier at one side of the other screw. By adjusting the two screws the carrier plate can be rocked on the edge of the bar as a pivot to vary the angular position of the plate, as will be readily understood.

Fixed rigidly on the carrier plate, preferably integral therewith, is a thermostatic member 19, in the form of an open circular ring of metal arranged in the plane of the lever's movement. Attached at one end to the carrier, the ring extends in front of the same and down between the arms of the fork, thence rearwardly, and upwardly between the forks, terminating above but slightly in rear of the carrier.

Securely fastened on the fixed end of the thermostat or temperature-responsive ring 19 by means of a clamp 20, is a metal tape 21, which is wrapped around the ring and extends tangentially beyond the free end of the latter to an elongated member or link 22, on which the tape is securely fixed by screws 23. This member 22 has a depending lug 24, in which a rod 25 (more fully described hereinafter) is secured by means of nuts 26. At its other end the link 22 is connected to a coil spring 27, which is in turn adjustably connected, by means of a threaded nut 28 and screw 29, to a bar 30 extending across and preferably integral with the adjacent arms 31, 32, of the lever.

The rod 25 extends longitudinally of the lever through the arms 31, 32, which, as will be seen in Fig. 2, are offset upwardly, and is connected to a fork or yoke 33 the arms of which extend under the arms of the lever and carry knife-edges 34 for connection with the load-counter-balancing spring 35 by any convenient means as for example by the yoke 36. The under-surfaces of the lever arms 31, 32, are inclined upwardly and rearwardly, that is, toward the fulcrum 12, as shown at $31^a$, and the upper surfaces of the arms of fork 33 are similarly inclined. Between the inclined surfaces, ball-bearings 37 are provided so that the fork or yoke can be shifted longitudinally of the lever with minimum friction.

Secured to the underside of the lever arms 31, 32, is a plate 38, having a stud 39, too short to touch the yoke 33 under normal conditions but adapted to support the yoke (and rod 25) if at any time the counterbalancing spring 35 is disconnected from its upper attachment (not shown). The plate 38 also has a stud 40 for connection with the lower end of a draft rod 41, which extends upwardly to the indicating or comporting devices (not shown) to actuate or control the same as the lever is rocked on its fulcrum 12 by the weight of the goods suspended from the shackle or clevis 14.

Being composed of a single metal, or, if of two different metals, the one having the greater coefficient of expansion being on the outside of the ring, as the temperature increases, the free end of the ring moves toward the opposite end of the lever, allowing the spring 27 to shift the rod 25 toward the left, thereby moving the yoke or block 33 outwardly. This lengthens the lever-arm between the shackle 14 and the spring-connection pivots 34, which compensates for the softening of the spring 35. At the same time the pivots 34 move downwardly by reason of the incline 31ª on which the block 33 moves, thus compensating for the elongation of the spring 35 and thereby restoring or maintaining correct zero-balance. As the temperature falls, the reverse operation takes place: the member 19 contracts or uncurls and draws the pivots 34 inwardly against the tension of spring 27, thereby raising said pivots to compensate for the contraction of the spring 35 and shortening the lever-arm to compensate for the increased stiffness of the spring.

The initial adjustment of the tension of spring 27 is effected by means of the screw 29 and nut 28, and is made strong enough to prevent upward and inward displacement of the block 33 by the weight of the goods exerted through shackle 14. The thermostat is preferably made stiff enough to prevent material distortion by spring 27, but said thermostat when uncurling has sufficient power to overcome the tension of the spring 27. It will be understood that it is impossible for the thermostat 19 to directly oppose the movement of pivot 34 to the right inasmuch as connection to this pivot is made by a flexible metallic tape 21 having no appreciable resistivity in compression. It is for this reason that spring 27 is employed and given the initial tension heretofore mentioned. The position of the block to enable the scale to weigh correctly at a given temperature is determined by adjusting the nuts 26 on rod 25, thereby shifting the rod and the block in one direction or another. The thermostat 19, which may be of any suitable metal or combination of metals, can be adjusted rotatively by manipulating the screws 17, 18, so that the tape 21 will be truly tangential to the ring, thereby avoiding a short bend and insuring against breakage of the tape at such point.

It is to be understood that the invention is not limited to the construction herein specifically illustrated and described but can be embodied in other forms without departure from its spirit. I am aware that curved thermostats, say of U-shape and similar forms, have been used before in scales, and that it is not new to provide an inclined path for the spring construction; but what I claim is:

1. In a scale, in combination, a lever, a fulcrum therefor, means carried by the lever for enabling the goods to be weighed to rock the lever on said fulcrum, a counterbalancing spring, a connection between the spring and the lever, a temperature - responsive member in the form of an open ring arranged in the plane of the lever's movement, having one end mounted on the lever, means connecting the other end of the temperature-responsive member to the said spring connection to shift the same as the temperature varies and including a spring adapted to prevent shifting of said spring connection by the weight of the goods being weighed.

2. In a scale, in combination, a lever having a fork at one end; a fulcrum for the lever; a curved thermostat mounted between the arms of the fork in the plane of the lever's movement, the thermostat extending downwardly, rearwardly and upwardly between the arms of the fork and terminating above the fork; a counterbalancing spring; shiftable means connecting the spring to the lever to resist the rocking thereof; a connection between the free end of the curved thermostat and the said means to shift the latter relatively to the lever as the temperature varies; and means to enable the goods to be weighed to rock the lever.

3. In a scale, in combination, a lever having a fork at one end; a fulcrum for the lever; an open ring-shaped thermostat arranged in the plane of the lever's movement between the arms of the fork and secured at one end to the lever; a counterbalancing spring; shiftable means connecting the spring to the lever; a rod extending longitudinally of the lever and connected with said means to shift the same; a spring connected with the lever and said rod to shift the latter in one direction; and means connecting the free end of the thermostat with the rod to permit shifting of the latter by its spring as the temperature varies in one direction and to shift the rod against the tension of the spring as the temperature varies in the other direction.

4. In a scale, in combination, a lever; a fulcrum therefor; a curved thermostat arranged in the plane of the lever's movement, having one end secured to the lever; a counterbalancing spring having shiftable connection with the lever; means enabling the weight of the goods to be weighed to rock the lever in its fulcrum; means having nonshiftable connection with the lever for connecting the latter with an indicating mechanism; and connecting means between the free end of the thermostat and the shiftable spring-connection to shift the latter longitudinally of the lever as the temperature varies.

5. In a scale, in combination, a lever; a fulcrum therefor; means for enabling the weight of the goods to be weighed to rock the lever on its fulcrum; a curved thermostat arranged in the plane of the lever's movement, fixed to the lever by one end; a counterbalancing spring; a device shiftable longitudinally of the lever and connecting said spring with the lever; a member connected with the free end of the thermostat; a rod shiftable longitudinally of the lever, connected at one end to said connecting device and at its other end adjustably connected to the said member, and a spring connected to the lever and to said member to shift the connecting device as the temperature varies in one direction and permit the thermostat to shift said device as the temperature varies in the other direction.

6. In a scale, in combination, a lever; a fulcrum for the lever; a curved thermostat arranged in the plane of the lever's movement and connected at one end to the lever; means for rotatively adjusting the thermostat in its own plane to vary the position of its free end in said plane; a counterbalancing spring; a device connecting the spring with the lever and shiftable longitudinally of the lever; a connection between said device and the free end of the thermostat for shifting said device as the temperature varies; and means for connecting the lever with a support for the goods to be weighed.

7. In a scale, in combination, a lever having a fork at one end and fulcrumed at the ends of the arms of the fork; a curved thermostat arranged in the plane of the lever's movement between said arms and at one end connected to said arms; means for rotatively adjusting the thermostat in its own plane to vary the position of its free end in said plane; means for connecting the lever to a support for the goods to be weighed; a counterbalancing spring; a shiftable device connecting the spring to the lever; and means connecting said device to the free end of the thermostat.

8. In a scale, in combination, a lever; a fulcrum therefor; a thermostat carried by the lever, in the form of an open, circular ring connected to the lever by one end; a counterbalancing spring; a shiftable device connecting the spring with the lever; means connecting the free end of the thermostat to the shiftable device, said means including a flexible tape extending from the free end of the thermostat tangentially thereto; and means for connecting the lever with a support for the goods to be weighed.

9. In a scale, in combination, a lever; a fulcrum therefor; a thermostat carried by the lever; a counterbalancing spring; a shiftable device connecting the spring to the lever; a rod connected at one end to the shiftable device and extending longitudinally of the lever toward the thermostat; a link connected at one end to the thermostat and having a lug to which the other end of the said rod is adjustably connected; a spring connecting the other end of the link to the lever; and means for connecting the lever to a support for the goods to be weighed.

10. In a scale, in combination, a lever; a fulcrum therefor; a thermostat in the form of an open circular ring secured at one end to the lever; a counterbalancing spring; a shiftable device connecting the spring to the lever; a flexible tape extending from the free end of the thermostat tangentially thereto; a link connected to the free end of the tape and extending longitudinally of the lever; a rod adjustably connected at one end to the link and at its other end connected to said shiftable device; a spring connected to the link and to the lever to shift the former in one direction and permit shifting of the link in the opposite direction by the thermostat, as the temperature varies; and means for connecting the lever to a support for the goods to be weighed.

11. In a scale, in combination, a lever, a fulcrum therefor, means carried by the lever for enabling the goods to be weighed to rock the lever on said fulcrum, a counterbalancing spring, a connection between the spring and lever shiftable longitudinally of the lever to compensate for change in the flexibility of the spring at different temperatures and vertically to compensate for elongation and contraction of the spring due to temperature changes, thermostatic means for shifting said connection in one direction and for controlling the amount of movement in the opposite direction, and a spring for effecting the movement of said connection in the opposite direction under the control of said thermostat.

12. In a scale, in combination, a lever, a fulcrum therefor, means carried by the lever for enabling the goods to be weighed to rock the lever on said fulcrum, a counterbalancing spring, a connection between the spring and lever shiftable longitudinally of the lever to compensate for change in the flexibility of the spring at different temperatures and vertically to compensate for elongation and contraction of the spring due to temperature changes, thermostatic means for shifting said connection in one direction and for controlling the amount of movement in the opposite direction, a spring for effecting the movement of said connection in the opposite direction under the control of said thermostat, and adjusting means carried by the lever for varying the initial setting of the said connection to obtain a correct scale reading at a given temperature.

In testimony whereof I hereunto affix my signature.

BERT W. KING.